United States Patent [19]

Adell

[11] Patent Number: 4,520,593
[45] Date of Patent: * Jun. 4, 1985

[54] INSULATED EDGE GUARD

[75] Inventor: Robert Adell, Novi, Mich.

[73] Assignee: U.S. Product Development Company, Sunnyvale, Tex.

[*] Notice: The portion of the term of this patent subsequent to Apr. 12, 2000 has been disclaimed.

[21] Appl. No.: 391,619

[22] Filed: Jun. 24, 1982

[51] Int. Cl.³ ............................................. B60J 5/00
[52] U.S. Cl. .................................................... 49/462
[58] Field of Search ........................... 49/462; 428/215

[56] References Cited

U.S. PATENT DOCUMENTS

| 3,265,556 | 8/1966  | Hungerford et al. | 428/215 |
| 3,547,516 | 12/1970 | Shanok et al.     | 49/462 X |
| 4,316,348 | 2/1982  | Adell             | 49/462 |
| 4,372,083 | 2/1983  | Hatzikelis et al. | 49/462 |
| 4,379,377 | 4/1983  | Adell             | 49/462 |

Primary Examiner—Kenneth Downey
Attorney, Agent, or Firm—Stephenson & Boller

[57] ABSTRACT

An insulated edge guard comprises for the insulating liner superimposed layers of polyvinylchloride and polyvinylfluoride with the former adhered to the body of the edge guard and the latter being on the exterior to present a desired color.

10 Claims, 3 Drawing Figures

INSULATED EDGE GUARD

BACKGROUND AND SUMMARY OF THE INVENTION

This invention relates to ornamental and protective edge guards which are applied to the edges of body panels commonly used in automotive vehicle bodies, such as the vehicle door edges.

In a typical automotive vehicle door edge guards are applied to trailing edges of the vehicle's doors to protect the door edges from damage which might be caused by striking an object which may be present in a door's path when the door is opened. It is very desirable for such door edge guards to be made of bright metal, such as stainless steel, aluminum, or bi-metal, due to the superior protective and ornamental characteristics of such materials. Furthermore, the inherent strength and resiliency of such metallic edge guards enable them to be self-retaining on the doors. Correspondingly, it is generally undesirable to use separate fasteners or adhesive in securing edge guards to doors since they involve extra cost in labor and materials. It is also generally undesirable to use non-metallic edge guards, such as vinyl edge guards, since they do not possess the superior protective, ornamental, and self-retention characteristics of the bright metallic edge guards. In connection with the use of self-retaining edge guards, it has heretofore been recognized that the potential for paint scratching and marring exists when the metallic edge guards are applied to vehicle doors. Such paint scratching can lead to premature corrosion of the door edge metal. Some of applicant's own inventions have addressed the paint scratching problem and provided solutions. For example reference is made to U.S. Pat. Nos. 4,259,812; 4,334,700; 4,316,348 and to pending application Nos. 194,748; 194,747; 194,749; 216,483; 216,860; 205,419; 205,420; 323,510; 323,513; 323,512; 323,511; 369,332. Certain of these patents and pending applications disclose the use of plastic liners to insulate the metallic edge guard from the door edge. From the standpoint of ease of installation on a door edge, the most desirable construction is to provide the liner as an integral laminate to the metallic edge guard channel. In accordance with procedures invented by applicant one way of providing this construction is by laminating plastic film to sheet metal material and then roll forming the laminate to the desired cross sectional shape.

Several of the above mentioned patents and pending patent applications disclose edge guard constructions in which a portion of the insulating material is visible on the exterior of the edge guard installed on a vehicle door. For example the visible insulating material comprises a thin band running lengthwise of the metal strip at the distal end of the bead of the outer leg of the U-shaped cross section of the channel which applies the self-retention force against the outside of the door edge. The present invention in certain respects represents an improvement upon an edge guard of this type in which a portion of the liner is exposed to view. From the standpoint of economy and manufacturing, plastic films of polyvinylchloride are deemed particularly advantageous. The polyvinylchloride film can be readily bonded to the metal which forms the edge guard channel section and it provides suitable insulating characteristics. One problem which has been noted by applicant in connection with polyvinylchloride film is that lighter colored versions of such film are susceptible to color change due to environmental factors. This means that the color range which is commercially acceptable must comprise darker colors such as black, dark brown, or navy. This limited color range may not be accepted for all styling requirements for automotive vehicles with which the edge guards are to be used. Lighter colored polyvinylchloride films tend to discolor with age, being attacked by ozone, moisture, ultra-violet radiation, salt air, exposure to extreme heat and cold, detergents, oil, etc.

The present invention is directed to a new and improved insulated edge guard which possesses the advantages of polyvinylchloride film, yet which also provides for color appearances which are not limited to the darker shades referred to above and which are highly resistant to discoloration due to the factors also mentioned above. With the invention, a versatility is imparted to commercially acceptable performance requirements for an insulated edge guard. The color appearance of the insulation may be chosen to match the color of the bright metal of the edge guard. Alternatively the color may be chosen to match that of the painted body panel on an edge portion of which the edge guard is disposed. Still another possibility is that the color may be different from both the painted body panel and the exterior of the metal channel. With the first two possibilities the appearance of the insulated edge guard channel is rendered virtually like that of uninsulated edge guards in which the appearance is that of a bright metal strip running along the edge on which it is disposed.

The preferred embodiment of the invention comprises for the insulating liner superimposed layers of film. The inner film is a polyvinylchloride film which is readily adhered to the metal of the edge guard channel by procedures described in other of applicant's patents and patent applications. The other is an outer film of polyvinylfluoride which is bonded to the polyvinylchloride film by conventional procedures. Polyvinylfluoride is itself not directly readily bondable to the metal of the edge guard channel, yet it does bond to the polyvinylchloride. Unlike the polyvinylchloride, the lighter colors of polyvinylfluoride do not experience the discoloration problem. Hence the invention achieves a significant improvement in an edge guard of the type described.

The foregoing features, advantages and benefits of the invention, along with additional ones, will be seen in the ensuing description and claims which should be considered in conjunction with the accompanying drawing. The drawing discloses a preferred embodiment of the invention according to the best mode contemplated at the present time in carrying out the invention.

DESCRIPTION OF THE PREFERRED EMBODIMENT

Figure 1:
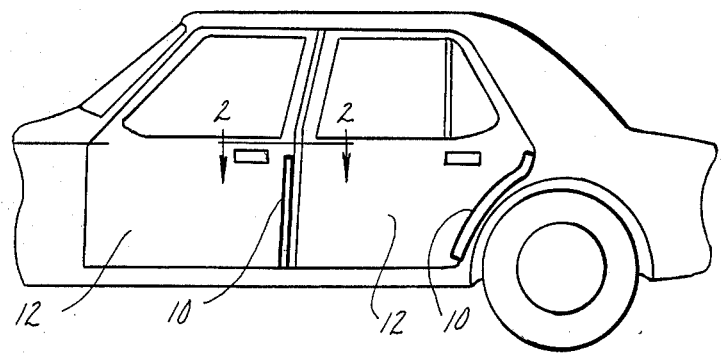
FIG. 1 is a fragmentary side elevational view of an automobile body showing edge guards on the doors in accordance with principles of the present invention.
Figure 2:
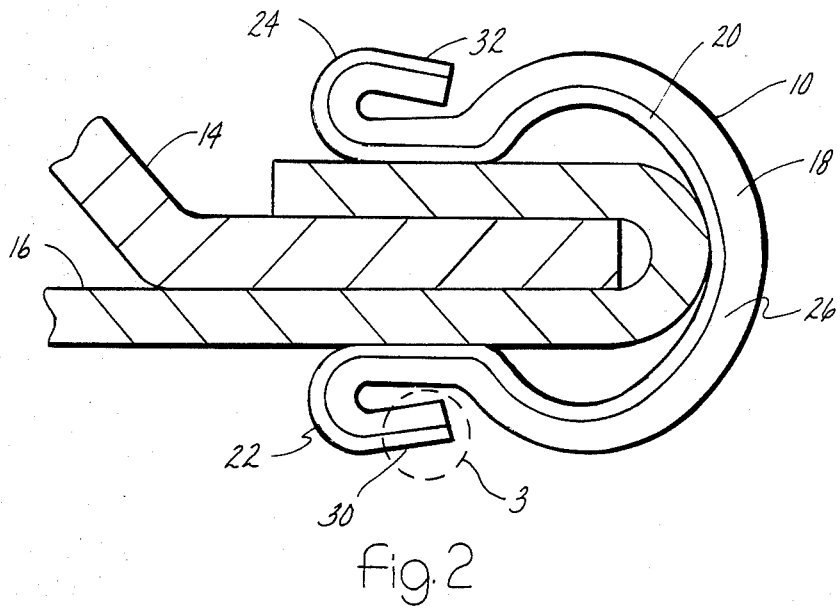
FIG. 2 is a sectional view, on an enlarged scale, taken in the direction of arrows 2—2 in FIG. 1.
Figure 3:
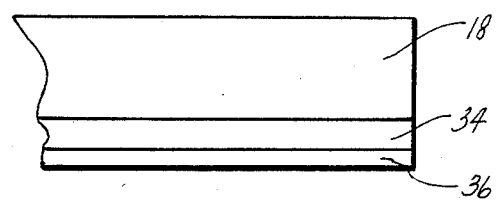
FIG. 3 is an enlarged fragmentary view of a portion of the edge guard of FIG. 2 taken in circle 3.

FIG. 1 illustrates an ornamental and protective edge guard 10 embodying principles of the invention applied to each of the doors 12 of an automobile. The shape of each edge guard corresponds to the shape of the trailing edge of the corresponding door to which it is applied. The illustrated edge guards are shown to be generally co-extensive in length with the trailing edges of the sheet metal doors; however they may be shorter, depending upon the specific requirements for a given model of automobile. As can be seen in FIG. 2 the typical door edge to which a door edge guard is applied includes an inner sheet metal door panel 14 around the free edge of which is wrapped the peripheral margin of an outer sheet metal door panel 16. For various reasons involved in the prevailing manufacture of vehicle doors, the thickness of the door edge is subject to substantial variation in dimension, and a satisfactory door edge guard must be capable of accommodating the substantial variations. Typically the dimension across the throat of the edge guard is dimensioned to accommodate a minimum thickness door edge and the legs of the edge guard may flex outwardly to accommodate edges of larger thickness.

FIG. 2 shows the edge guard 10 to comprise a metallic edge guard channel 18 and an insulating liner 20. The insulating liner 20 is applied in surface-to-surface contact with the full surface of one side of the metal strip from which the edge guard channel 18 is formed and then the laminate is roll-formed to the illustrated cross section. Details of this fabrication procedure are disclosed in certain of the above mentioned patents and patent applications of applicant. The resultant construction has insulated metal beads 22, 24 respectively at the distal ends of the outer and inner legs of the edge guard channel. The illustrated cross sectional shape may be considered as comprising a generally semi-circular segment 26 constituting the base of the U. The legs of the cross section which extend from the base of the U are formed in accordance with the disclosure of application Ser. No. 323,513. The cross sectional configuration of the edge guard yields the advantage of better dimensional control in roll forming with the result being a strong yet resiliently expansible edge guard construction. The beads 22, 24 are formed by outwardly reversing the extreme distal margins of the legs approximately 180°. In the illustrated cross section the reversals are slightly more than 180° each with there being provided small openings respectively in the respective beads. However, the beads could be fully closed with the distal edges being bent back flat against the immediately adjacent portions of the legs. Because the insulating liner lines one entire surface of the metal strip from which the edge guard is formed, the resultant beaded construction has the insulating liner exposed on the exterior of the installed edge guard as thin bands running lengthwise of the edge guard at the distal end of each leg. Thus the reference numeral 30 identifies the band for the outer leg, and the reference numeral 32 the band for the inner leg. It should be appreciated that with the edge guards installed on the vehicle as in FIG. 1 and with the vehicle door closed it is only the band 30 which is visible.

As explained above, the prior construction for the insulating liner was a single layer of polyvinylchloride film. Because of the discoloration problem the color of the polyvinylchloride film had to be dark in order to be commercially suitable. However this limited the acceptability of the edge guard because of certain styling considerations for certain vehicles.

It has now been discovered that a commercially acceptable product, both from the standpoint of styling consideration and from the standpoint of color stability, can be achieved. This is done by making the liner a composite construction comprising two superimposed layers of film. The insulating liner 20 is shown to comprise an inner film 34 and an outer film 36. The inner film secures the insulating liner to the metal of the edge guard channel while the outer film provides the color appearance for the liner. The outer material is polyvinylfluoride, a material which has good color stability for all colors, even for lighter shades. The problem however with the application of polyvinylfluoride film to a door edge guard is that the polyvinylflouride film can not be readily directly bonded to the underlying base material of the edge guard channel (i.e. the metal). However it is possible to adhere the two films together to form the insulating liner such that the polyvinylfluoride film is on the exterior while the inner film of polyvinylchloride bonds the liner to the metal of the edge guard channel. Thus the invention has the advantage of polyvinylchloride film in that the insulating liner can be readily bonded to the underlying metal through the use of bonding procedures such as heat and/or adhesive, yet the polyvinylchloride is not exposed to view. Rather it is the polyvinylfluoride which is the visible surface of the liner and which possesses color stability.

One of the advantages of the invention is that versatility is imparted to the styling of the channel in conjunction with the styling of the vehicle on which the edge guard channel is installed. For example, by imparting a silver metallic color to the polyvinylfluoride film the film color can be matched to the exposed metal of the edge guard channel which appears with the edge guard installed on the door edge. Thus, although a thin band 30 of insulating material therefore appears along the distal edge of the outer leg of the edge guard, its color matches with the edge guard channel and makes it appear as if there were no liner material at all at the distal end of the leg. Another possibility is that the amount of exposed metal of the insulated edge guard can be reduced to make the edge guard look thinner by imparting to the polyvinylfluoride film a color which matches that of the door. The automobile door is typically primed and painted to present a desired exterior color. The polyvinylfluoride film may be colored to match the color of the painted door so that to an observer the distal end of the outer leg of the edge guard appears to match the door and hence a reduced amount of bright metal of the edge guard is available for view thereby giving the edge guard a thinner appearance. A still further possibility is that the polyvinylfluoride film may be colored to other than that of either the metal of the edge guard or the painted door.

Indeed as a further extension of principles of the invention it would be possible to apply liner to both sides of the metal strip before roll forming. The U-shaped channel will then comprise not only to the interior of the edge guard being lined but the exterior as well. By making the color match that of the painted door a metallic edge guard can be made so that its entire exterior matches the color of the painted door. In other words the advantages of a metal self-retaining are retained while the color of the edge guard is made to match that of the vehicle. With the illustrated cross section the longitudinal edges of the metal strip, even though uncovered, are substantially concealed from view. The end edges are also uncovered but are generally not prominent. If deemed appropriate, the ends could be covered or protected by spraying or dipping. Because substantially all of the metal is covered, a lower grade material (i.e. not bright and shiny) can be used for the metal channel.

The insulating liner itself may be fabricated by any of various possible procedures. It may be fabricated as a laminate of two extruded films and the laminate applied to the metal strip which is to form the edge guard channel. Alternatively other fabrication procedures are contemplated, such as by spraying the material to form the film, rather than extruding the film. Either one or the other or both of the films could possibly be sprayed on. Application by dipping is also possible. The preferred construction also comprises the polyvinylchloride film as being substantially thicker than the polyvinylfluoride film, this being a more economical construction.

It is also contemplated that principles of the invention may be extended to other applications. For example, the insulating liner can be applied to metal, wood, plastic or other base materials. In these applications a desired color appearance with suitable color stability is provided on the exterior while the interior may be bonded to the base material by conventional procedures. Thus it is possible to apply the insulating liner to a surface of a building panel such as styrofoam, wood, drywall, plastic, etc. For such applications, the thicknesses of the liner and of its constituent layers may be made thicker than those which are used in the door edge guard application described above. Such building panels can be on the exterior of a building where they retain color stability in spite of being exposed to sunlight, ozone, moisture, etc. It is possible for the base material to be an eavestrough, downspout, or siding for a building. The laminate could also be used on automobile body panels instead of paint and primer.

While a preferred embodiment of the invention has been disclosed it will be appreciated that principles of the invention are applicable to other embodiments.

What is claimed is:

1. In a vehicle body having a sheet metal body panel of a given color on a marginal edge portion of which is disposed an ornamental and protective metallic edge molding of generally U-shaped cross section comprising an inner leg and an outer leg whose free ends bear against opposite sides of said marginal edge portion and an insulating liner disposed between the metallic edge molding and said marginal edge portion, including the locations where the free ends of the legs bear against said marginal edge portion, to insulate the molding from the panel, the molding including a bead at the free end of said outer leg with the insulating liner covering the bead on the side thereof opposite the side which is disposed toward said marginal edge portion, the improvement characterized in that the insulating liner comprises two superimposed layers of plastic film, one layer being an inner plastic film via which the liner is secured to the metallic edge molding and the other of which is an outer plastic film of polyvinylfluoride which has a color matching that of said panel, said inner plastic film being a material other than polyvinylfluoride.

2. The improvement set forth in claim 1 in which the inner plastic film is polyvinylchloride film.

3. The improvement set forth in claim 1 in which the free end of the inner leg also includes a bead and the liner covers that portion of the latter bead which is on the side thereof opposite the side which is disposed toward said marginal edge portion.

4. The improvement set forth in claim 1 in which the thickness of the inner film is greater than that of the outer film.

5. The improvement set forth in claim 1 in which the liner lines the entire interior of the U-shaped cross section.

6. In a vehicle body having a sheet metal body panel on a marginal edge portion of which is disposed an ornamental and protective metallic edge molding of generally U-shaped cross section comprising an inner leg and an outer leg whose free ends bear against opposite sides of said marginal edge portion and an insulating liner disposed between the metallic edge molding and said marginal edge portion, including the locations where the free ends of the legs bear against said marginal edge portion, to insulate the molding from the panel, the molding including a bead at the free end of said outer leg with the insulating liner covering the bead on the side thereof opposite the side which is disposed toward said marginal edge portion and with the exterior of the molding between the free ends of its legs presenting its own natural metallic appearance, the improvement characterized in that the insulating liner comprises two superimposed layers of plastic film, one layer being an inner plastic film via which the liner is secured to the metallic edge molding and the other of which is an outer plastic film of polyvinylfluoride which has a color matching the natural metallic appearance of the molding, said inner plastic film being a material other than polyvinylfluoride.

7. The improvement set forth in claim 6 in which the inner plastic film is polyvinylchloride film.

8. The improvement set forth in claim 6 in which the free end of the inner leg also includes a bead and the liner covers that portion of the latter bead which is on the side thereof opposite the side which is disposed toward said marginal edge portion.

9. The improvement set forth in claim 6 in which the thickness of the inner film is greater than that of the outer film.

10. The improvement set forth in claim 6 in which the liner lines the entire interior of the U-shaped cross section.

* * * * *